United States Patent [19]
Chen

[11] Patent Number: 6,070,948
[45] Date of Patent: Jun. 6, 2000

[54] BICYCLE WHEEL RIM

[75] Inventor: Chao-Ying Chen, Tainan Hsien, Taiwan

[73] Assignee: Alex Machine Industrial Co., Ltd., Tainan Hsien, Taiwan

[21] Appl. No.: 09/373,099

[22] Filed: Aug. 12, 1999

[51] Int. Cl.[7] .................................................. B60B 21/00
[52] U.S. Cl. ................................ 301/97; 301/58; 301/98
[58] Field of Search ................................. 301/95, 96, 97, 301/98, 55, 58, 61, 104, 57

[56]  References Cited

U.S. PATENT DOCUMENTS

| | | | |
|---|---|---|---|
| 486,146 | 11/1892 | Westwood et al. | 301/97 |
| 607,201 | 7/1898 | Waggoner | 301/96 |
| 2,034,360 | 3/1936 | Sill | 301/96 |
| 3,933,392 | 1/1976 | Wells | 301/98 |
| 4,531,754 | 7/1985 | Engleman | 301/98 |
| 4,626,036 | 12/1986 | Hinsberg et al. | 301/58 |
| 5,061,013 | 10/1991 | Hed et al. | 301/95 |
| 5,228,756 | 7/1993 | Krampera | 301/95 |
| 5,249,846 | 10/1993 | Martin et al. | 301/95 |
| 5,499,864 | 3/1996 | Klein et al. | 301/97 |
| 5,651,591 | 7/1997 | Mercat et al. | 301/58 |
| 5,653,510 | 8/1997 | Osborne | 301/95 |
| 5,975,646 | 11/1999 | Campagnolo | 301/95 |

*Primary Examiner*—Russell D. Stormer
*Assistant Examiner*—Long Buo Nguyen
*Attorney, Agent, or Firm*—Townsend and Townsend and Crew LLP

[57]  ABSTRACT

A bicycle wheel rim includes an annular rim body and a plurality of mounting members. The rim body has an axis, and includes a tire retaining portion which has annular left and right tire retaining walls that are spaced apart from each other. Each of the tire retaining walls has a radial inner edge proximate to the axis of the rim body, and a radial outer edge distal to the axis of the rim body. The rim body further includes an annular spoke mounting portion disposed radially inward of the tire retaining portion and interconnecting the radial inner edges of the tire retaining walls. The spoke mounting portion has two opposite lateral outer surfaces, and is formed with a plurality of receiving holes that extend through the lateral outer surfaces and that are distributed along the length of the rim body. The mounting members are received in the receiving holes, respectively. Each of the mounting members has two opposite mounting ends that project from the lateral outer surfaces of the spoke mounting portion. Each of the mounting ends is formed with a spoke mounting hole adapted for mounting a spoke thereon.

3 Claims, 6 Drawing Sheets

6,070,948

1

BICYCLE WHEEL RIM

BACKGROUND OF THE INVENTION

1. Field of the Invention

This invention relates to a bicycle wheel rim, more particularly to a bicycle wheel rim which is relatively easy to manufacture, and which obviates the need for an inner tire body and a liner for lining the inner tire body.

2. Description of the Related Art

Referring to FIGS. 1 and 3, a conventional bicycle wheel rim 1 is shown to include annular left and right tire retaining walls 12 for retaining a bicycle tire therebetween, and an annular spoke mounting wall 11 interconnecting radial inner edges of the tire retaining walls 12. A plurality of spoke mounting holes 10 are formed in the spoke mounting wall 11 generally along a central line of the latter, and are adapted for mounting a plurality of spokes fasteners 2 the wheel rim 1. During assembly, the spoke fasteners 2 are extended from between the tire retaining walls 12 and through the spoke mounting holes 10, respectively, to permit fastening of a plurality of spokes 31 to the wheel rim 1. Referring to FIGS. 2 and 3, the wheel rim 1 is connected to a hub 3 by means of the spokes 31 to form a bicycle wheel. Each of the spokes 31 has one end fastened on a respective one of the spoke fasteners 2 and the other end fastened on one end 30 of the hub 3. Since the spoke mounting holes 10 are formed in the spoke mounting wall 11, the conventional bicycle tire 4 is generally designed to include an inflatable inner tire body 41 and a wear-resistant anti-slip outer tire body 42. To prevent the inner tire body 41 from being damaged by head portions 21 of the spoke fasteners 2, an annular liner 43 must be provided around the spoke mounting wall 11 between the head portions 21 of the spoke fasteners 20 and the inner tire body 41 to line the latter. The requirement of the inner tire body 41 and the liner 43 thus complicates the manufacturing process and increases the manufacturing costs. Moreover, the spokes 31 apply a tension force to the wheel rim 1 at the spoke mounting wall 11 in a direction generally transverse to the spoke mounting wall 11. The spoke mounting wall 11 is thus susceptible to deformation.

SUMMARY OF THE INVENTION

Therefore, the object of the present invention is to provide a bicycle wheel rim which is relatively easy to manufacture, and which obviates the need for an inner tire body and a liner.

Accordingly, the bicycle wheel rim of the present invention includes an annular rim body and a plurality of mounting members. The rim body has an axis, and includes a tire retaining portion which has annular left and right tire retaining walls that are spaced apart from each other. Each of the tire retaining walls has a radial inner edge proximate to the axis of the rim body, and a radial outer edge distal to the axis of the rim body. The rim body further includes an annular spoke mounting portion disposed radially inward of the tire retaining portion and interconnecting the radial inner edges of the tire retaining walls. The spoke mounting portion has two opposite lateral outer surfaces, and is formed with a plurality of receiving holes that extend through the lateral outer surfaces and that are distributed along the length of the rim body. The mounting members are received in the receiving holes, respectively. Each of the mounting members has two opposite mounting ends that project from the lateral outer surfaces of the spoke mounting portion. Each of the mounting ends is formed with a spoke mounting hole adapted for mounting a spoke thereon.

2

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
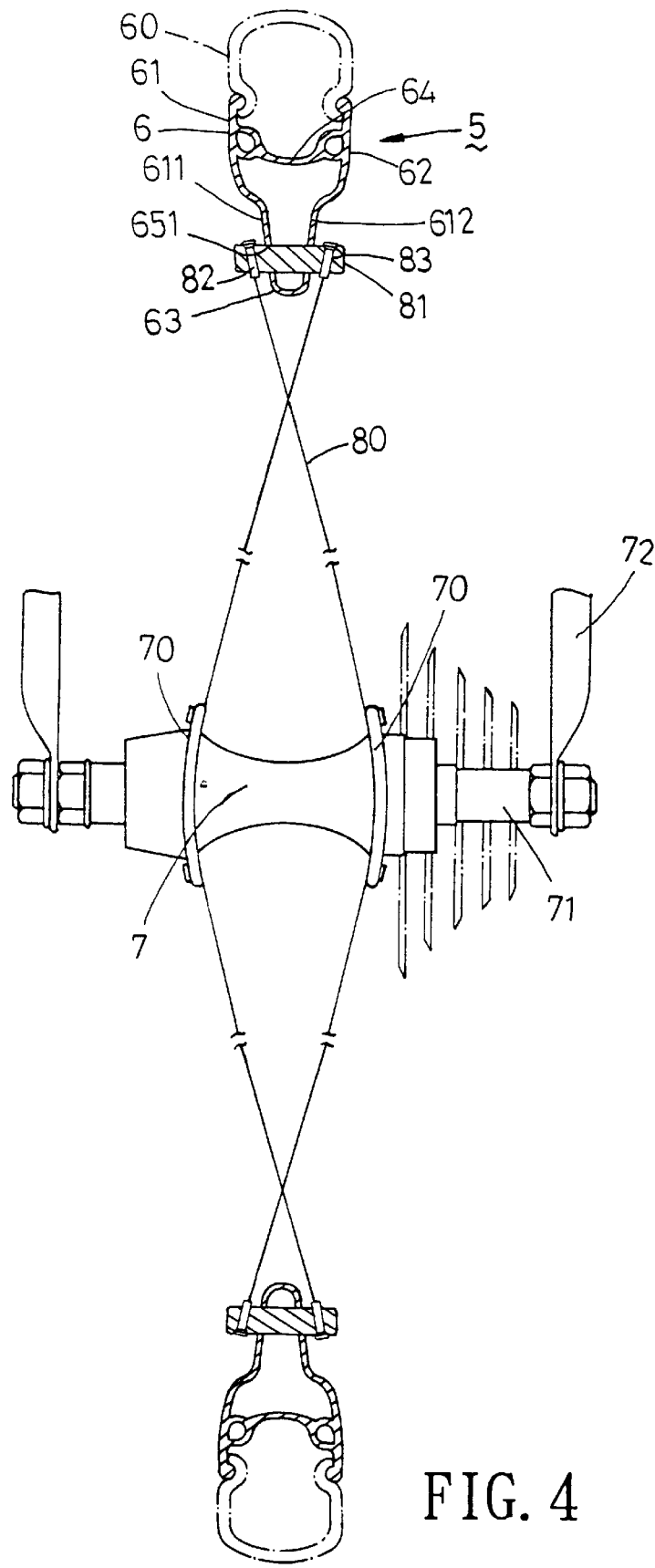
FIG. 4 is a sectional schematic view of a preferred embodiment of a bicycle wheel rim of the present invention when mounted on a hub to form a bicycle wheel.
Figure 5:
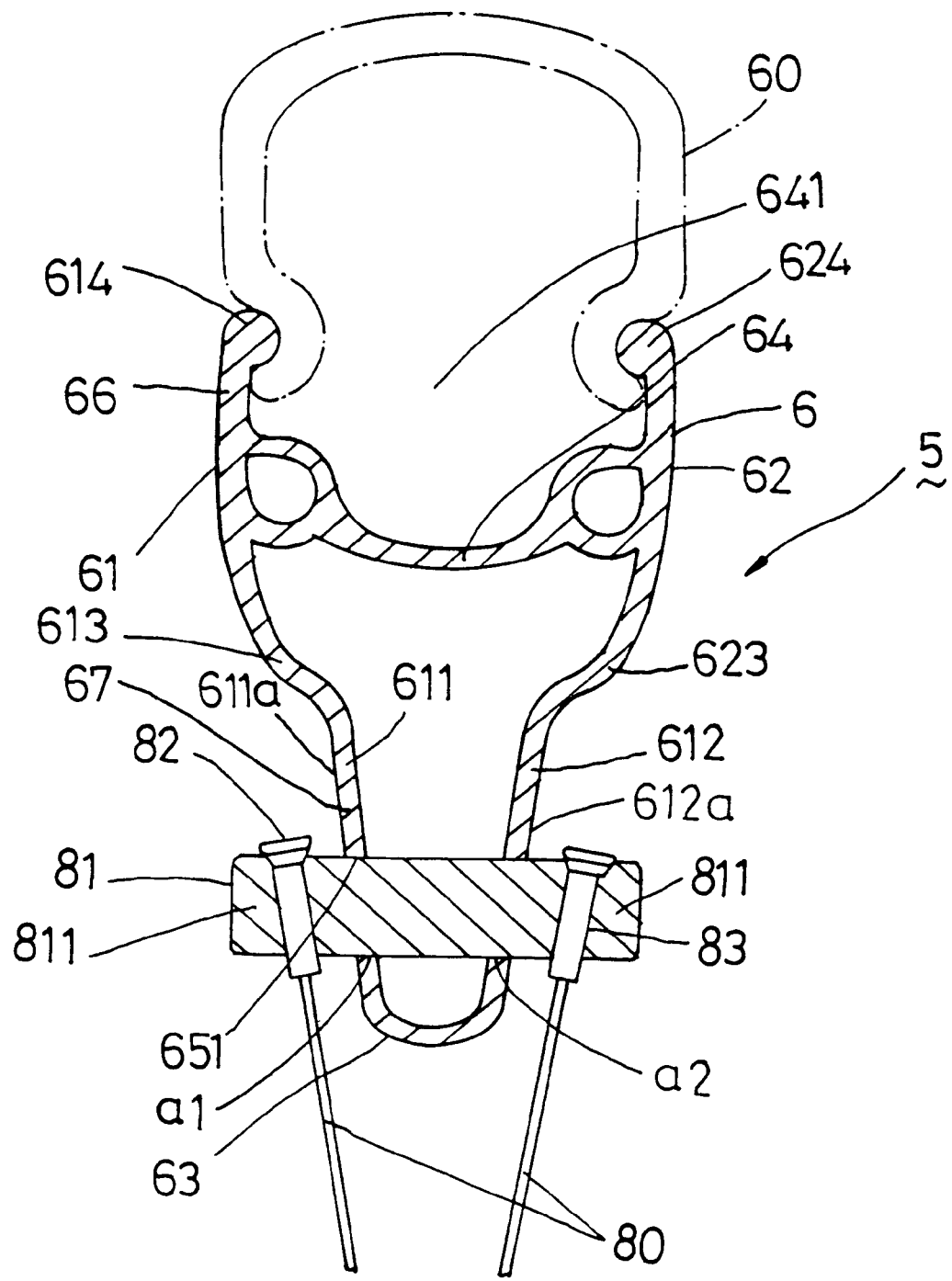
FIG. 5 is a fragmentary sectional view of the preferred embodiment.

Referring to FIGS. 4 and 5, the preferred embodiment of the bicycle wheel rim 5 of the present invention is adapted to be mounted on a hub 7 by means of a plurality of spokes 80 to form a bicycle wheel. The bicycle wheel is to be installed on a bicycle frame 72 by means of an axle 71 that extends through two opposite lateral ends 70 of the hub 7. The bicycle wheel rim 5 is shown to include an annular rim body 6, and a plurality of mounting members 81 mounted on the rim body 6.

The rim body 6 includes a radial outer tire retaining portion 66, and a radial inner spoke mounting portion 67 connected to and disposed radially inward of the tire retaining portion 66. The tire retaining portion 66 includes radially extending annular left and right tire retaining walls 61, 62 which are spaced apart from each other. Each of the tire retaining walls 61, 62 has a radial inner edge 613, 623 proximate to an axis of the rim body 6, a radial outer edge 614, 624 distal to the axis of the rim body 6, and an intermediate portion between the inner and outer edges. An annular outer connecting wall 64 is formed between the tire retaining walls 61, 62 to interconnect the intermediate portions of the tire retaining walls 61, 62. An outer tire body 60 is to be retained between the radial outer edges 614, 624 of the tire retaining walls 61, 62.

The spoke mounting portion 67 includes an annular left side wall 611 which extends radially inward from the inner edge 613 of the left tire retaining wall 61, an annular right side wall 612 which extends radially inward from the inner edge 623 of the right tire retaining wall 62, and an annular inner connecting wall 63 interconnecting radial inner edges of the left and right side walls 611, 612. The spoke mounting portion 67 converges gradually in a radial inward direction, and has two opposite lateral outer surfaces 611a, 612a formed respectively on the left and right side walls 611, 612. The spoke mounting portion 67 further has a plurality of receiving holes 651 which are formed through the lateral outer surfaces 611a, 612a, and which are distributed along the length of the spoke mounting portion 67.

Each of the mounting members 81 is received in a respective one of the receiving holes 651, and has two opposite mounting ends 811 that project respectively from the lateral outer surfaces 611*a*, 612*a*. Each of the mounting ends 811 is formed with a spoke mounting hole 83 adapted for receiving a spoke fastener 82 so as to permit fastening of a spoke 80 thereon. The spoke mounting holes 83 formed in the mounting ends 811 of each mounting member 81 are staggered with one another.

When the outer tire body 60 is mounted on the left and right tire retaining walls 61, 62, an air receiving chamber 641 is formed among the left and right tire retaining walls 61, 62, the outer connecting wall 64 and the outer tire body 60.

Figure 6:
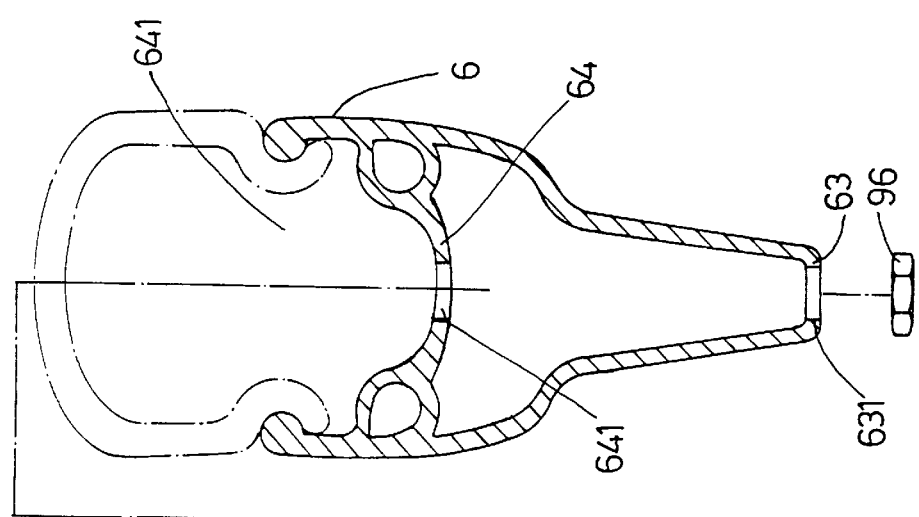
FIG. 6 is another fragmentary sectional view of the preferred embodiment, showing how a valve unit is mounted on the bicycle wheel rim.

Referring to FIG. 6, in order to mount a valve unit 9 on the wheel rim 5 for inflating the air receiving chamber 641, an inner valve receiving hole 631 and an outer valve receiving hole 641 aligned with the inner valve receiving hole 631 are formed respectively in the inner connecting wall 63 and the outer connecting wall 64.The valve unit 9 includes a tubular sleeve 91 which extends through the outer valve receiving hole 641 and which has one end formed with an annular flange 92 that is seated on the outer connecting wall 64. The sleeve 91 is provided with an O-shaped sealing ring 93. A conventional inflating valve member 95 is extended through the sleeve 91, and is retained on the rim body 6 by means of a nut 96 which engages one end of the valve member 95.

Figure 7:
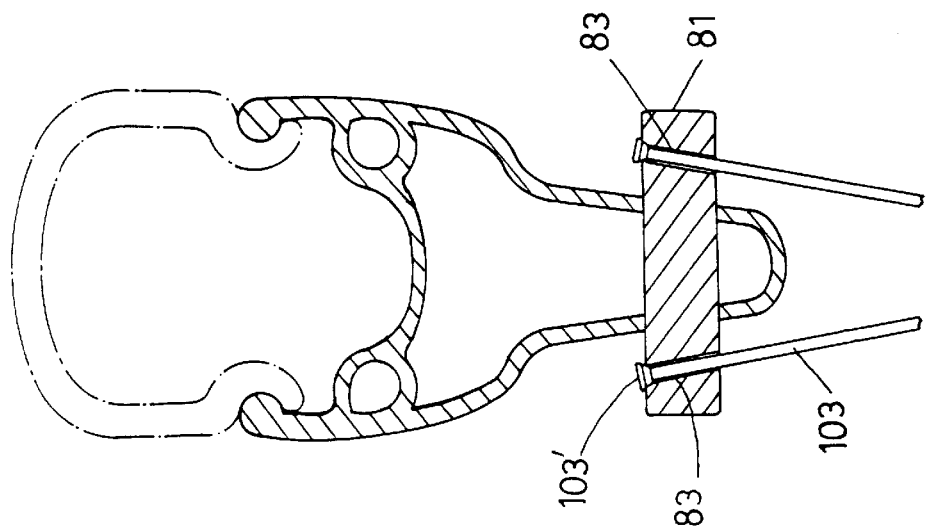
FIG. 7 is a fragmentary sectional view of the preferred embodiment when used with spokes of another kind.

Referring to FIG. 7, the bicycle wheel rim 5 of the present invention is also suitable for use with spokes 103 of another kind which have enlarged head portions 103' for retention at the spoke mounting holes 83 without the need for using spoke fasteners.

Figure 1:
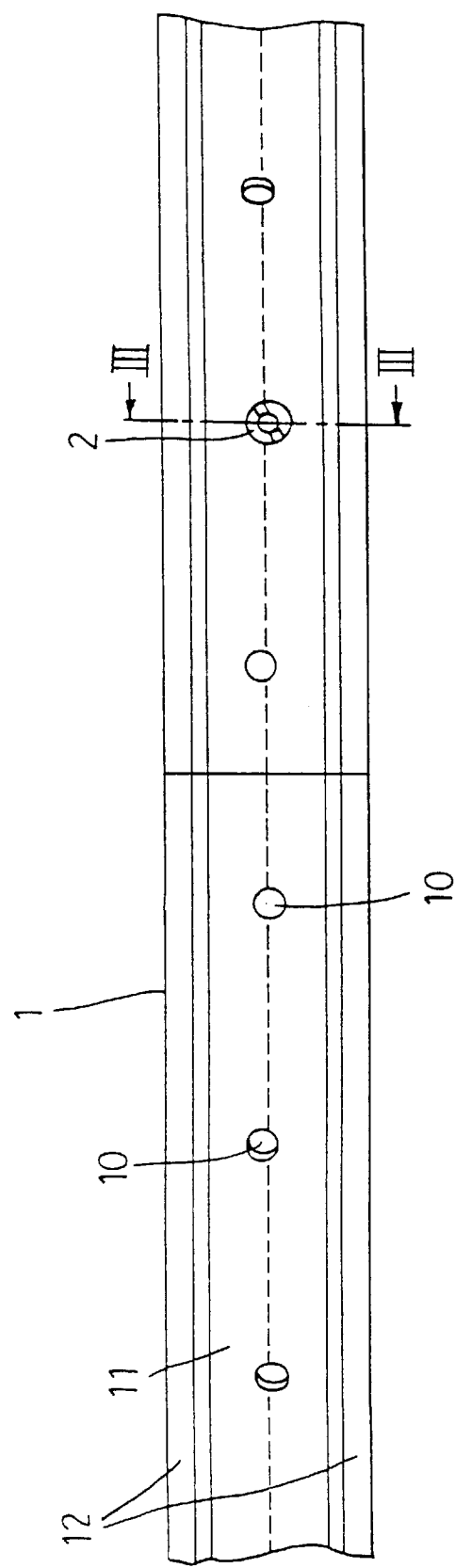
FIG. 1 is a fragmentary schematic view illustrating a conventional bicycle wheel rim.
Figure 2:
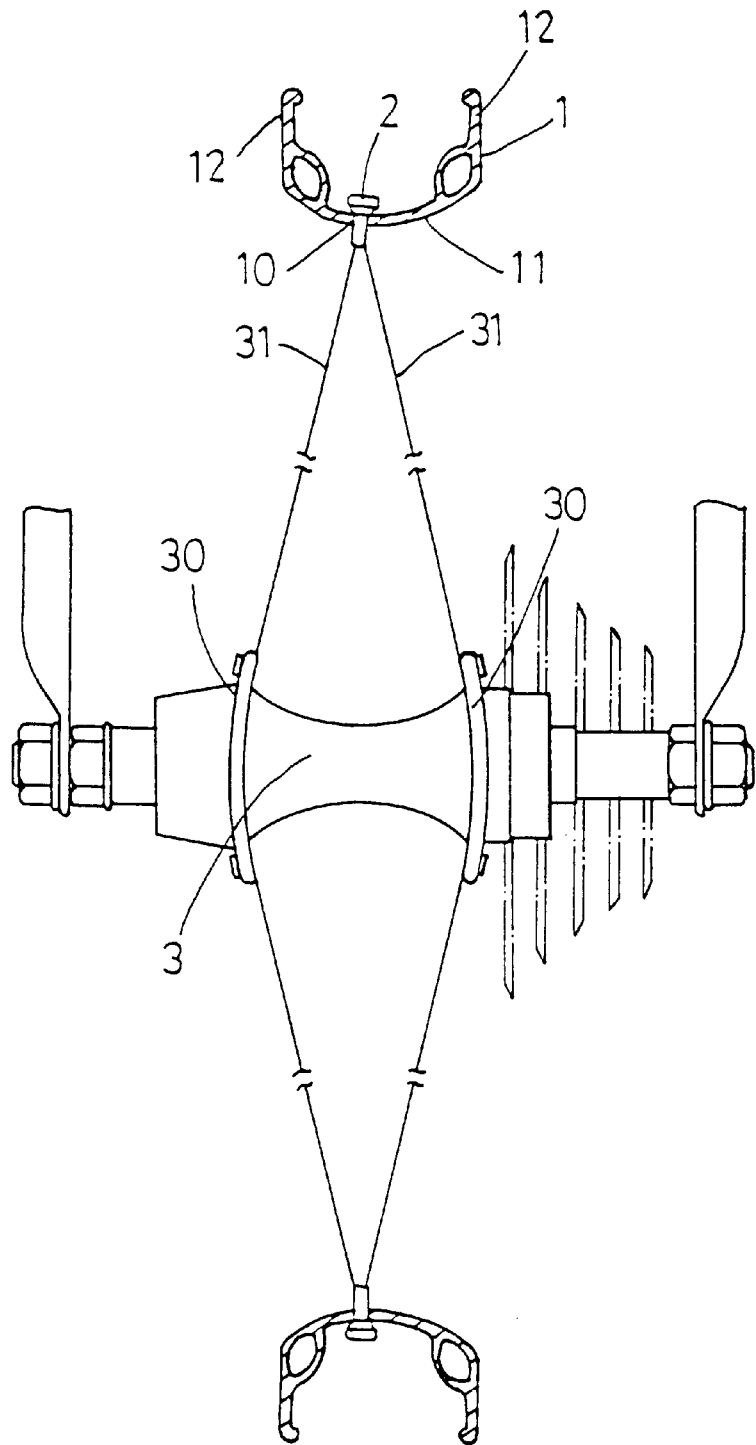
FIG. 2 is a sectional schematic view of the conventional bicycle wheel rim when mounted on a hub to form a bicycle wheel.
Figure 3:
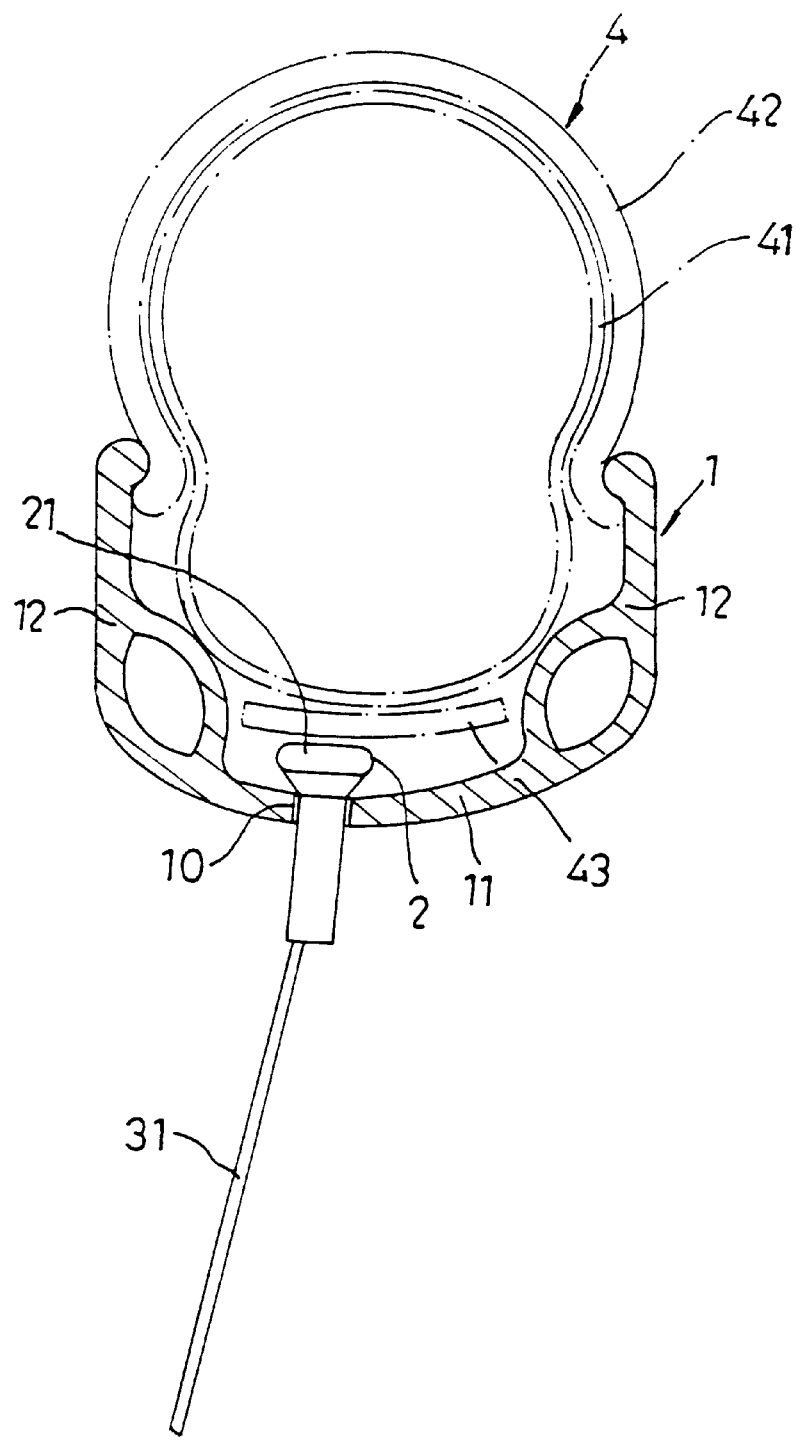
FIG. 3 is a fragmentary sectional view of the conventional bicycle wheel rim.

Accordingly, since the spoke mounting holes 83 are not formed in the connecting wall 64, the left and right tire retaining walls 61, 62, the outer connecting wall 64 and the outer tire body 60 can cooperatively confine an air-tight air receiving chamber. An inner tire body is thus unnecessary, and a liner for lining the inner tire body is also unnecessary to reduce the manufacturing costs. Moreover, during manufacturing, the formation of the receiving holes 651 in the spoke mounting portion 67 of the rim body 6 is easier to conduct than those of the spoke mounting holes 10 in the conventional wheel rim 1 of FIG. 3. Referring to FIG. 5, the spokes 80 apply a tension force on the rim body 6 at the points (a1) and (a2) in a direction generally along the left and right side walls 611, 612. The wheel rim 5 is found to be more resistant to deformation due to the tension force applied by the spokes 80. Therefore, the thickness of the left and right side walls 611, 612 can be reduced to lower the weight of the entire rim body 6, while maintaining a sufficient strength to resist deformation thereof. During assembly of the wheel rim 5 to the hub 7, the spoke fasteners 81 or the spokes 103 per se are extended through the spoke mounting holes 83 on lateral outer sides of the rim body 6, instead of being extended between the tire retaining walls 61, 62. This results in added convenience during assembly.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bicycle wheel rim adapted for mounting a plurality of spokes thereon, comprising:

an annular rim body having an axis and including a tire retaining portion which has annular left and right tire retaining walls that are spaced apart from each other, each of said tire retaining walls having a radial inner edge proximate to the axis of said rim body and a radial outer edge distal to the axis of said rim body, said rim body further including an annular spoke mounting portion disposed radially inward of said tire retaining portion and interconnecting said radial inner edges of said tire retaining walls, said spoke mounting portion having two opposite lateral outer surfaces, and being formed with a plurality of receiving holes that extend through said lateral outer surfaces and that are distributed along length of said rim body; and a plurality of mounting members received in said receiving holes, respectively, each of said mounting members having two opposite mounting ends that project from said lateral outer surfaces of said spoke mounting portion, each of said mounting ends being formed with a spoke mounting hole adapted for mounting a respective one of the spokes thereon.

2. The bicycle wheel rim according to claim 1, wherein said spoke mounting portion of said rim body includes annular left and right side walls formed with said lateral outer surfaces, said left side wall extending radially inward from said radial inner edge of said left tire retaining wall, said right side wall extending radially inward from said radial inner edge of said right tire retaining wall, each of said receiving holes being formed through said left and right side walls.

3. The bicycle wheel rim according to claim 2, wherein each of said left and right tire retaining walls further has an intermediate portion between said radial inner edge and said radial outer edge, said tire retaining portion of said rim body further having an annular connecting wall which interconnects said intermediate portions of said left and right tire retaining walls.

* * * * *